US008591854B2

(12) United States Patent  
Rai et al.

(10) Patent No.: US 8,591,854 B2
(45) Date of Patent: Nov. 26, 2013

(54) METHODS FOR SOLUBILIZING AND SEPARATING LARGE FULLERENES

(75) Inventors: Pradeep K. Rai, Houston, TX (US); A. Nicholas Parra-Vasquez, Bordeaux (FR); Haiqing Peng, Sugar Land, TX (US); Robert Hauge, Houston, TX (US); Matteo Pasquali, Houston, TX (US)

(73) Assignee: William Marsh Rice University, Houston, TX (US)

( * ) Notice: Subject to any disclaimer, the term of this patent is extended or adjusted under 35 U.S.C. 154(b) by 285 days.

(21) Appl. No.: 12/672,605

(22) PCT Filed: Aug. 8, 2008

(86) PCT No.: PCT/US2008/072693
§ 371 (c)(1),
(2), (4) Date: Sep. 12, 2011

(87) PCT Pub. No.: WO2009/021211
PCT Pub. Date: Feb. 12, 2009

(65) Prior Publication Data
US 2011/0318248 A1    Dec. 29, 2011

Related U.S. Application Data

(60) Provisional application No. 60/954,739, filed on Aug. 8, 2007.

(51) Int. Cl.
*C01B 31/00* (2006.01)
*B82Y 40/00* (2011.01)
*B82Y 30/00* (2011.01)

(52) U.S. Cl.
USPC .................. 423/445 B; 977/734; 977/845

(58) Field of Classification Search
USPC ........... 423/445 B, 447.1, 460, 461; 977/842, 977/845, 847
See application file for complete search history.

(56) References Cited

U.S. PATENT DOCUMENTS

| | | | |
|---|---|---|---|
| 5,177,248 A * | 1/1993 | Chiang et al. | 560/86 |
| 5,462,680 A * | 10/1995 | Brois et al. | 508/110 |
| 5,904,852 A * | 5/1999 | Tour et al. | 210/635 |
| 2001/0016283 A1 * | 8/2001 | Shiraishi et al. | 429/218.2 |
| 2003/0031619 A1 * | 2/2003 | Schleier-Smith et al. | 423/447.1 |

FOREIGN PATENT DOCUMENTS

| | | |
|---|---|---|
| EP | 1550635 | 7/2005 |
| WO | 9745257 | 12/1997 |
| WO | 03004740 | 1/2003 |
| WO | 2008066683 | 6/2008 |

OTHER PUBLICATIONS

Dresselhaus, et al., Science of Fullerenes and Carbon Nanotubes, chapter 3 (pp. 60-79), Academic Press 1996.*
Yu, Min-Feng, et al., "Strength and Breaking Mechanism of Multiwalled Carbon Nanotubes Under Tensile Load," Science, vol. 287, Jan. 28, 2000, pp. 637-640.
Zhu, Yong, et al., "An electromechanical material testing system for in situ electron microscopy and applications," PNAS, Oct. 11, 2005, vol. 102, No. 41, pp. 14503-14508.
* cited by examiner

*Primary Examiner* — Daniel C McCracken
(74) *Attorney, Agent, or Firm* — Winstead PC (57) ABSTRACT

We have discovered that size dependent solubility of large fullerenes in strong acids is dependent on acid strength. This provides a scalable method for separating large fullerenes by size. According to some embodiments, a method for processing a fullerene starting material comprises large fullerenes comprises mixing the starting material with a first concentrated sulfuric acid solution so as to obtain a first dispersion comprising a first portion of the large fullerenes solubilized in the first concentrated sulfuric acid solution.

14 Claims, 5 Drawing Sheets

METHODS FOR SOLUBILIZING AND SEPARATING LARGE FULLERENES

CROSS-REFERENCE TO RELATED APPLICATION

This application claims priority to and benefit of U.S. Provisional Application Ser. No. 60/954,739, filed on Aug. 8, 2007, entitled: "Methods for Solubilizing and Separating Large Fullerenes, by inventors Rai, et al., hereby incorporated herein by reference.

GOVERNMENT SPONSORSHIP

This invention was made with government support under Grant No. 003604-0113-2003, awarded by the Advanced Technology Program of the state of Texas; and Office of Naval Research Grant No. N00014-01-1-0789, awarded by the U.S. Department of Defense. The government has certain rights in the invention.

FIELD OF THE INVENTION

The present invention relates to any one or combination of processing, solubilizing, and separating large fullerenes.

BACKGROUND OF INVENTION

Fullerenes are cage molecules that have the potential for application in various products, for example, in materials and pharmaceuticals. The potential for applications is expected to be enhanced by controlling the physical properties of the fullerenes, such as size, shape, and molecular weight. Thus it is desirable to produce fullerenes or with predetermined values of physical parameters. However, methods of making fullerenes tend to produce a mixture of fullerenes of physical parameters. Thus, it is desirable to have a method for separating fullerenes. More particularly, it is desirable to have a method for separating fullerenes according to a physical parameter. Still more particularly, it is desirable to have a method for separating fullerenes according to size.

BRIEF DESCRIPTION OF INVENTION

We have discovered that size dependent solubility of large fullerenes in strong acids is dependent on acid strength. This provides a scalable method for separating large fullerenes by size.

Thus, according to some embodiments, a method for processing a fullerene starting material comprises large fullerenes comprises mixing the starting material with a first concentrated sulfuric acid solution so as to obtain a first dispersion comprising a first portion of the large fullerenes solubilized in the first concentrated sulfuric acid solution.

The large fullerenes may have a size at least that of $C_{100}$.

The first concentrated sulfuric acid solution may have a concentration greater than 85% $H_2SO_4$. For example, the first concentrated sulfuric acid solution has a concentration of at least 88% $H_2SO_4$. For example, the first concentrated sulfuric acid solution may have a concentration of at least 90% $H_2SO_4$. For example, the first concentrated sulfuric acid solution may have a concentration of at least 96% $H_2SO_4$.

The first portion of the large fullerenes may be 100%. Alternatively, the first portion of the large fullerenes may be less than 100%.

The method may further comprise collecting a remainder of the starting material, wherein the remainder is not present in the first dispersion; and mixing the remainder with a second concentrated sulfuric acid solution so as to obtain a second dispersion comprising a second portion of the large fullerenes solubilized in the second concentrated sulfuric acid solution.

The first portion of the large fullerenes may have a first average fullerene size dependent on the concentration of the first concentrated sulfuric acid.

The method may further comprise selecting the concentration of the first concentrated sulfuric acid solution so as to select a first size measure comprising at least one of the average fullerene size of the first portion, the maximum fullerene size of the first portion, the distribution of sizes of the first portion, and combinations thereof.

The method may further comprise selecting the concentration of the second concentrated sulfuric acid solution so as to select a second size measure comprising at least one of the average fullerene size of the second portion, the maximum fullerene size of the second portion, the distribution of sizes of the second portion, and combinations thereof.

Size may be determined in units of mass.

The first size measure and the second size measure may differ such that the method comprises separation of the large fullerenes according to size.

The method may further comprise removing small fullerenes from the starting material, before mixing the starting material with the first concentrated sulfuric acid solution. The small fullerenes have a size less than that of $C_{100}$.

It will be understood that the above-described embodiments may be practiced singly or in combination. Further, each number written will be understood as if modified by the term "about" preceding the number.

BRIEF DESCRIPTION OF DRAWINGS

The following detailed description of the preferred embodiment of the invention will be better understood when read in conjunction with the appended drawings. It should be understood, however, that the invention is not limited to the precise arrangements and instrumentalities shown herein. The components in the drawings are not necessarily to scale, emphasis instead being placed upon clearly illustrating the principles of the present invention. Moreover, in the drawings, like reference numerals designate corresponding parts throughout the several views.

The invention may take physical form in certain parts and arrangement of parts. For a more complete understanding of the present invention, and the advantages thereof, reference is now made to the following descriptions taken in conjunction with the accompanying drawings, in which.

DETAILED DESCRIPTION OF THE INVENTION

We have discovered that size dependent solubility of large fullerenes in strong acids is dependent on acid strength. This provides a scalable method for separating large fullerenes by size.

As defined herein a fullerene has carbon atoms in completely closed single wall spherical and elliptical closed structures. As defined herein, large fullerenes are fullerenes having at least 100 carbon atoms. According to some embodiments, the large fullerene have 100-500 carbon atoms.

Samples that contain large fullerenes are dispersed into acids of different strengths. Depending on the strength of the acid different size ranges of fullerenes are extracted and collected. This process may be repeated to further refine the separation process.

It will be understood that strong acids are desirably safely handled and recycled and/or disposed of.

Large fullerenes are made in many carbon black production facilities so inexpensive starting materials exist. Large fullerenes provide a rugged well defined nanoparticle in the 1-2 nm range that is expected to find use in composites and as spacers in nano-engineered materials.

The following examples are included to demonstrate particular embodiments of the present invention. It should be appreciated by those of skill in the art that the methods disclosed in the examples that follow merely represent exemplary embodiments of the present invention. However, those of skill in the art should, in light of the present disclosure, appreciate that many changes can be made in the specific embodiments described and still obtain a like or similar result without departing from the spirit and scope of the present invention.

EXAMPLES

In the Examples we show that large fullerenes (LFs, $>C_{100}$) are soluble in concentrated sulfuric acids. Here, we report the unusually high solubility of LFs in concentrated sulfuric acids (64% to 96% $H_2SO_4$) and a convenient route to separate LFs by size. The Examples are based at least in part on a manuscript submitted for publication by the American Chemical Society (later published as Rai, P. K., et al., "Solubility and Size Separation of Large Fullerenes in Concentrated Sulfuric Acids", J. Phys. Chem. C, published on the web Aug. 18, 2007).

We employed a centrifugation technique in conjunction with UV-Vis-nIR spectroscopy to quantify solubility. The Beer's Law dependence of UV-Vis-nIR absorbance of LFs in concentrated sulfuric acids between 400 to 1400 nm wavelengths facilitated the construction of linear calibration curves for measuring LF concentration in acids. Centrifugation of concentrated dispersions of LFs in concentrated sulfuric acids resulted in a clear phase separation. UV-Vis-nIR absorbance measurement on the less concentrated phase yielded the solubility of LFs. Large fullerenes exhibited an unusually high solubility in sulfuric acids concentrated in the range of 88-96%. The solubility of LFs in 96% sulfuric acid was higher than the solubility of the smallest fullerene ($C_{60}$) in many organic solvents. We found that the solubility of LFs grows with acid strength consistent with solubilization by a protonation mechanism. Moreover, the average size of LFs solubilized in sulfuric acid increased with the strength of the acid.

Figure 4:
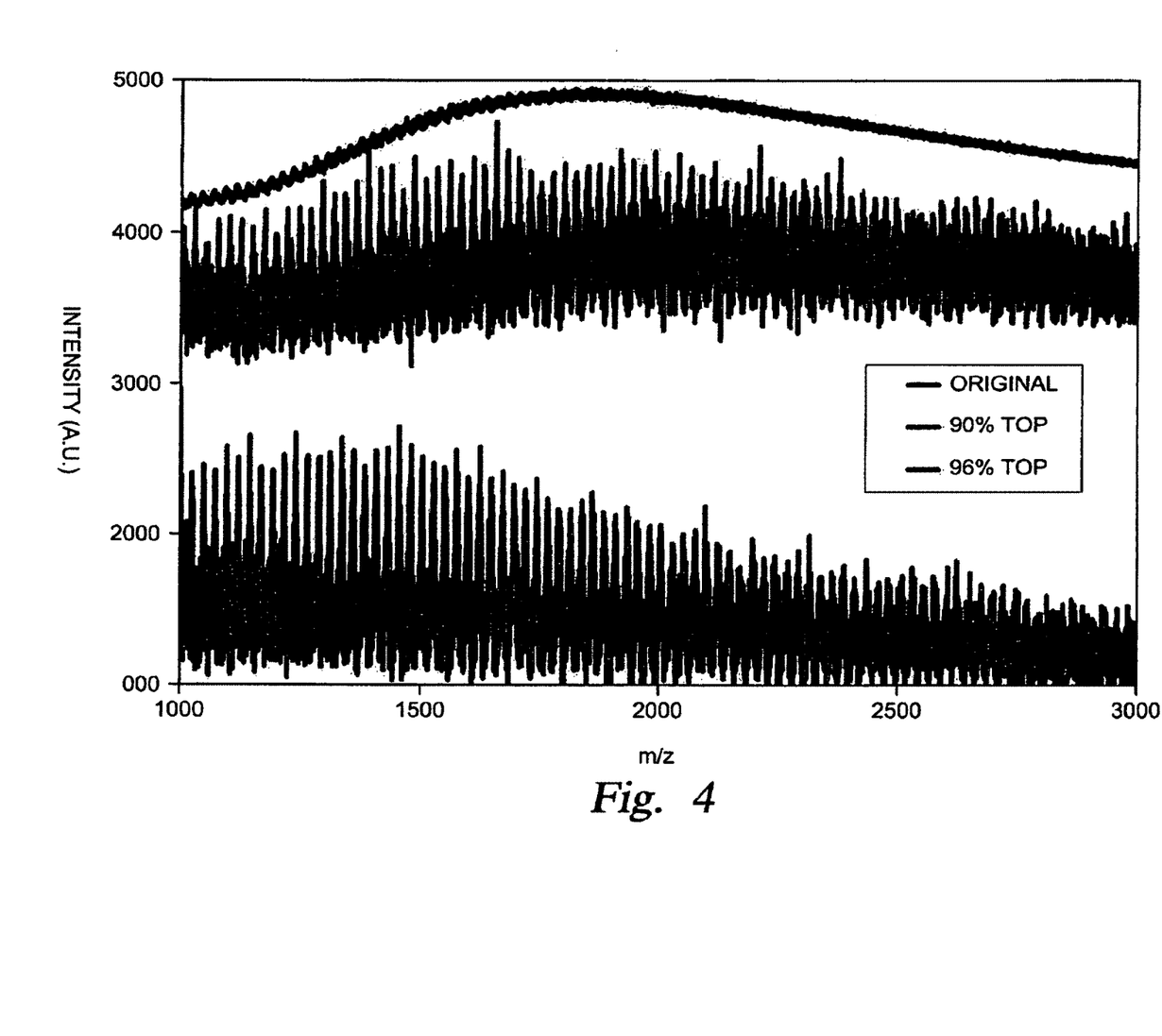
FIG. 4 depicts MALDI spectra of large fullerenes showing distribution of masses, showing the masses are evenly separated at a spacing of 24 amu, a well-known feature in the mass spectral pattern of fullerenes arising from the spacing of $C_2$ species, and showing the size of the solubilized fullerenes grows with the strength of the $H_2SO_4$.

Our technique for quantifying the solubility of LFs in concentrated sulfuric acids relied on centrifugation in conjunction with a method for measuring the concentration of dispersions of LFs in acids by UV-Vis-nIR spectroscopy. A higher-order fullerene mixture was acquired from Materials and Electrochemical Research (MER) Corporation (Tucson, Ariz.). Smaller fullerenes ($C_{60}$ and $C_{70}$) were removed from this mixture by dissolving them in ortho-dichlorobenzene, as the ortho-dichlorobenzene has one of the highest solubilities for $C_{60}$. A MALDI mass spectrum proves that this material is fullerenic (see FIG. 4a and also FIGS. 5 and 6). The raw sample shows a mass spectral span of 1200-4500 amu with the maximal intensity at 1850 amu. The masses were evenly separated at a spacing of 24 amu, a well-known feature in the mass spectral pattern of fullerenes arising from the loss of $C_2$ species. The MALDI spectrum also shows absence of small fullerenes like $C_{60}$ or $C_{70}$ in the starting material.

Figure 1:
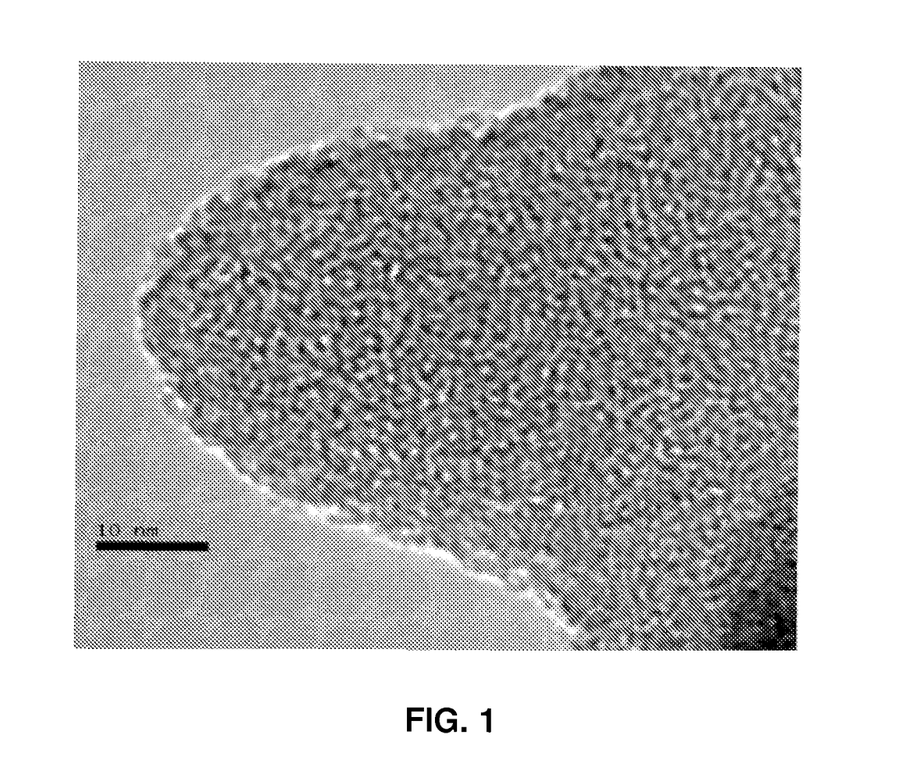
FIG. 1 depicts a TEM image of the starting material showing large fullerenes.

FIG. 1 is a TEM image of the starting material showing that it contains mostly LFs. Lighter fullerenes like $C_{60}$ or $C_{70}$ and carbon nanotubes, if at all present in the starting material, are in very small quantities. TGA analysis shows that metal content of the sample is less than 2 wt %.

ACS-certified 96% sulfuric acid was purchased from SIGMA-ALDRICH® and used as received without purification. Lower concentrations of sulfuric acid were prepared by slowly adding water to 96% sulfuric acid and mixing with a magnetic stirrer. LF dispersions were prepared by gentle mixing with a magnetic stir bar (no sonication) for a minimum of 72 hours at room temperature in an anhydrous environment (a glovebox with a dewpoint of −50° C.) to prevent moisture ingress. After mixing, the samples were centrifuged on a FISHER SCIENTIFIC® CENTRIFIC® Model 225 Bench-top centrifuge at 5100 rpm. UV-Vis-nIR absorbance spectra were measured on a SHIMADZU® UV-3101PC spectrometer in 1 mm pathlength Starna cells with TEFLON® closures. Elemental analysis of dissolved LFs was performed by X-ray Photoelectron Spectroscopy (XPS) on a PHI Quantera XPS.

At low concentration of LFs in sulfuric acids, light absorbance in the range from 400 to 1400 nm scales linearly with concentration. This Beer's Law behavior yields calibration curves for measuring LFs concentration in acids. Concentrated dispersions of LFs in concentrated sulfuric acids were centrifuged for 12 or more hours (after which no measurable changes in concentration were detected in the centrifugation vials); phase separation was visible in the lower acidity samples. The lower absorbance of the fullerene dispersion in the dilute phase at all wavelengths shows that phase separation occurs during the process of centrifugation. The less concentrated phase was diluted with a known amount of solvent; UV-vis-nIR absorbance measurements provided a quantitative measurement of concentration.

Figure 2:
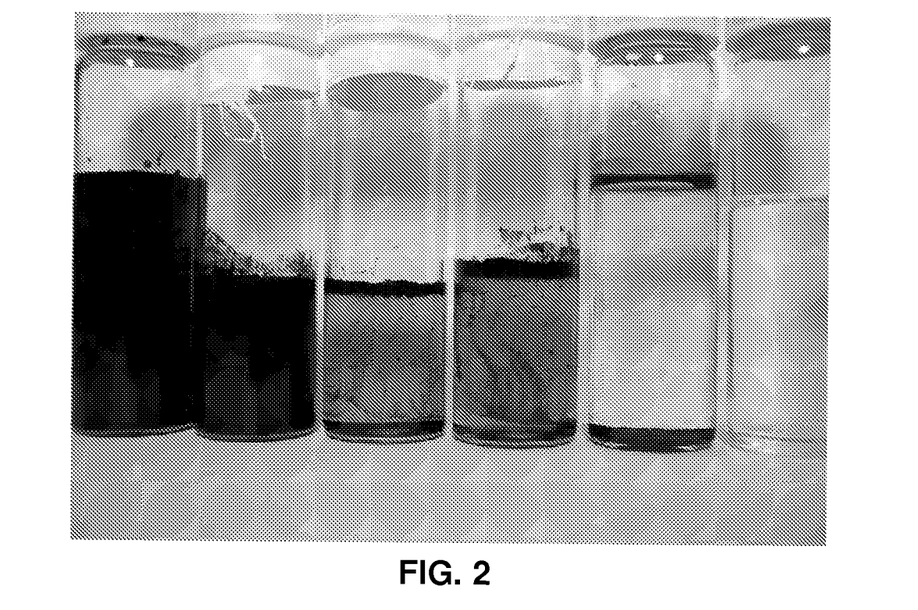
FIG. 2 depicts a photographic image of large fullerenes centrifuged in different strengths of sulfuric acid showing extent and trend of phase separation, for large fullerenes centrifuged in (a) 96% $H_2SO_4$, (b) 88% $H_2SO_4$, (c) 84% $H_2SO_4$, (d) 80% $H_2SO_4$, and (e) 64% $H_2SO_4$, where (f) Pure 96% $H_2SO_4$ is shown here for comparison.

FIG. 2 shows photographs of vials of LFs centrifuged from 1500 ppm (or 0.15 wt %) starting concentration in different strength of sulfuric acid ((a) 96%, (b) 88%, (c) 84%, (d) 80%, and (e) 64%); these dispersions display various extents of phase separation upon extended centrifugation at 5100 rpm. A vial of 96% $H_2SO_4$ (FIG. 2(f), shown for comparison) is a clear liquid. The phase separation of LFs from 64% $H_2SO_4$ is almost complete; therefore, the solubility of LFs in 64% sulfuric acid is minimal. In 64% $H_2SO_4$ ($\rho_{64\%}$=1.44, $\rho_F$=1.65; where $\rho_{64\%}$ is the density of the 64% sulfuric acid and $\rho_F$ is the density of the LFs), the top phase is structureless and optically uniform while the bottom phase includes most of the fullerenes. In 80-84% sulfuric acid ($\rho_{80\%}$=1.73 and $\rho_{84\%}$=1.77), where the density of the fullerenes is only slightly lower than that of the solvent, phase separation of fullerenes is visible upon centrifugation; most of the LFs cream at the top. However, the acid has acquired some coloration, indicating that some of the LFs have dissolved. Some particles are visible in the dilute phase. These are due to the minimal density difference between LFs and 80-84% sulfuric acid; removing the vials from the centrifuge causes some of the top to diffuse. In 88% $H_2SO_4$ ($\rho_{88\%}$=1.80), the initial dispersion of LFs, upon centrifugation, separates into a low concentration supernatant solution and a concentrated flocculated suspension of fullerenes in acid at the bottom. Although this phase separation is not as clear in the photographic image in FIG. 2 because of the high solubility of LFs in 88% $H_2SO_4$, it is clear from microscopic observation and UV-Vis-nIR measurements. It is surprising that the LF-rich phase would be at the top in 80-84% sulfuric acid and at the bottom in 88% acid, because the density of the acid grows with $SO_3$ content. In 96% $H_2SO_4$ ($\rho$=1.84), the dispersion is fully stable and no phase separation occurs over 48 hours of continuous centrifugation. Based on the analysis of Holladay (Biophys. Chem. 1979, 10, 187) and the relative densities of LFs and 96% sulfuric acid, we estimate that particles above ~5 nm would separate under the centrifugation conditions. This suggests that, in 96% $H_2SO_4$, the LFs are present as individuals, i.e., their solubility is higher than 1500 ppm. A similar experiment with 10,000 ppm (1%) LFs in 96% sulfuric acid showed that, within experimental uncertainty (about 3%), no phase separation occurred upon centrifugation. Therefore, the solubility of LFs in 96% $H_2SO_4$ is above 10,000 ppm (or 18 mg/ml).

Figure 3:
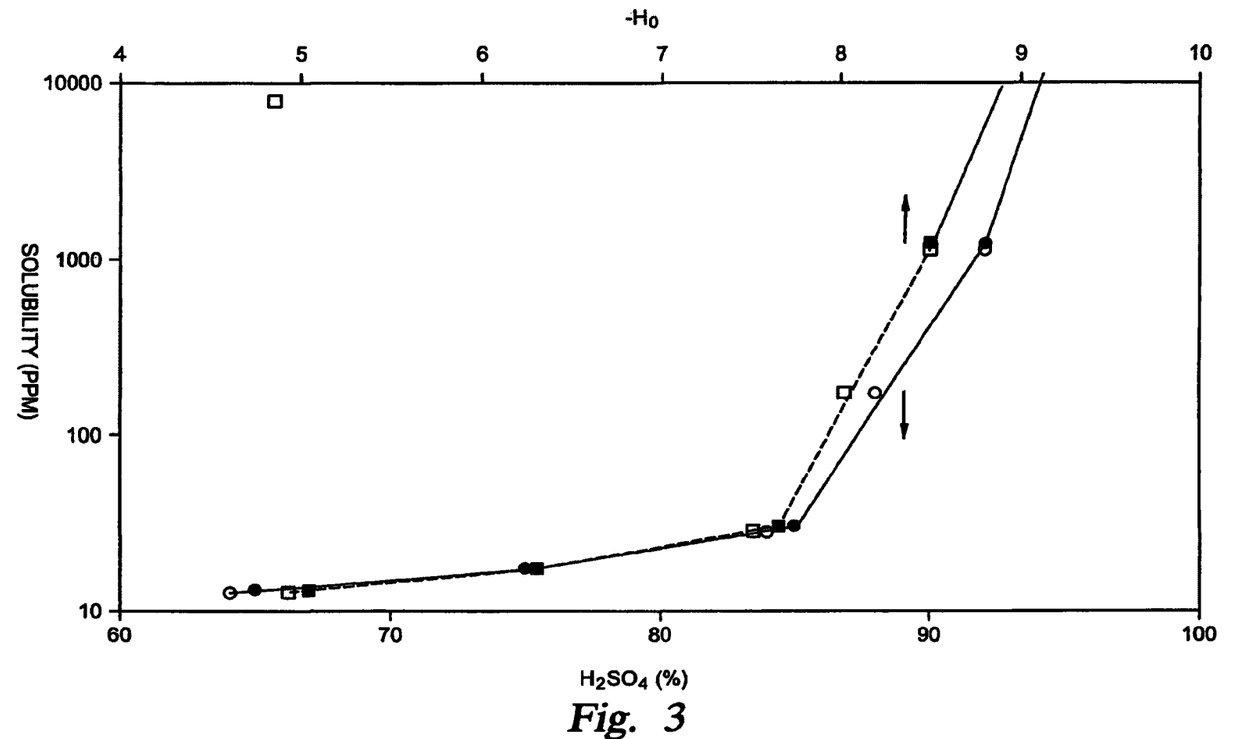
FIG. 3 depicts solubility of large fullerenes versus $H_2SO_4$ concentration (circles) and versus Hammett Acidity, $-H_0$ (squares), where the open and closed symbols are from two different data sets, showing the solubility of large fullerenes is higher than 10,000 ppm in 96% $H_2SO_4$.

FIG. 3 shows the solubility of LFs versus $H_2SO_4$ concentration and Hammett Acidity. The Hammett acidity factor values used in this plot are according to Paul and Long (Paul M. A.; Long, F. A., Chem. Rev. 1957, 57, 1. Table 3). Because the solubility of LFs is higher than 10,000 ppm in 96% $H_2SO_4$, it does not appear in this plot. Remarkably, the solubility of LFs rises sharply when the sulfuric acid concentration exceeds 85%—corresponding to a Hammett acidity of 7.5. It is worth remarking that at 84.5% concentration of sulfuric acid, the molar ratio of $H_2SO_4$ and $H_2O$ in the solution is 1:1 (i.e., 84.5/98=15.5/18) at which point there are only bisulfate ($HSO_4^-$) and hydronium ($H_3O^+$) ions in the medium. Only above this concentration the moles of $H_2SO_4$ exceed the moles of $H_2O$ in solution and free $H_2SO_4$ molecules are present in the solution. Free $H_2SO_4$ molecules undergo auto-ionization according to $2H_2SO_4 \rightarrow H_3SO_4^+ + HSO_4^-$. The free $H_3SO_4^+$ radical may protonate fullerenes (in the absence of competition from free water molecules) and stabilize fullerenes. The overall reaction of fullerenes with $H_2SO_4$ may be represented as Fullerene+$H_2SO_4 \rightarrow$ Fullerene$^+$+$HSO_4^-$ which may occur only when at acid concentration above 84.5%. This is reflected in enhanced solubility data of the fullerenes above 85% $H_2SO_4$, corroborating earlier observations (on single-walled carbon nanotubes) that fullerenes are being stabilized and solubilized by protonation. This particular transition in the molar ratios of $H_2SO_4$ and $H_2O$ is not captured by the Hammett acidity function, which varies almost linearly over the range of acid strength of interest here; nevertheless, the Hammett Acidity function is also included in the FIG. 3 because it is a thermodynamic measure of proton accepting/donating ability of a solvent system.

It is desirable to differentiate solubility from the formation of soluble functionalized complexes. Because our acid dispersion of LFs had neither $SO_3$ nor any solid precipitation, we believe that LFs are not functionalized, but are truly soluble in concentrated sulfuric acids. We further checked that LFs are not functionalized by performing X-Ray photoelectron spectroscopy (XPS). XPS identifies elements from lithium to uranium, with detection levels down to one atomic percent. If LFs are functionalized in 96% sulfuric acid, then the XPS spectra detect sulfur atoms. LFs were dissolved in 96% $H_2SO_4$ for two weeks and were subsequently quenched in ether and washed with methanol on a polycarbonate filter paper. The XPS spectra of these LFs (see FIGS. 5 and 6) shows that the sample consists entirely of carbon atoms; the sulfur content is less than 0.1% (atomic), below the sensitivity of the instrument. This proves that LFs were not functionalized in concentrated sulfuric acids. We hypothesize that 96% $H_2SO_4$ is a strong enough acid to form a reversible polycarbocation similar to what observed in the case of single-walled carbon nanotubes in fuming sulfuric acid. Such fractional charge on the carbon atoms is sufficient to stabilize the LFs but not strong enough to functionalize them. Interestingly, no metal was detected in the XPS spectra.

The size distribution of LFs solubilized in different strengths of sulfuric acid was measured by MALDI spectroscopy. Because acid-stabilized dispersions of fullerenes do not show any MALDI peaks characteristic of fullerenes, it was necessary to transfer fullerenes from acid into an organic solvent.

Acid dispersions of fullerenes were quenched in nanopure water (15:1 excess water), soaked overnight, settled at the bottom of the vial by centrifuging for few minutes (~5 minutes), re-suspended in nanopure water at least twice (to remove any residual acid), and then collected again at the bottom of the vial by centrifugation.

FIG. 4 shows the size distribution of LFs in the starting material and in those dissolved in sulfuric acid after quenching and washing with water. The mass spectra of the starting material shows the maximum intensity at 1850 amu. The mass spectra of LFs solubilized in 90% $H_2SO_4$ shows the maximum intensity around 1450 amu and in 96% $H_2SO_4$ around 1700 amu—close to the starting material. This indicates that smaller LFs are solubilized preferentially in the weaker acids. In particular, dependence of the size of solubilized LFs depends on the strength of sulfuric acid. The ability to separate LFs by size by varying the strength of the acid provides an advancement that may be useful in various applications.

A centrifugation technique has been used in conjunction with UV-Vis-nIR spectroscopy to quantify the solubility of large fullerenes in concentrated sulfuric acids (weaker than 96% $H_2SO_4$). Large fullerenes exhibit an unusually high solubility in the range of 88-96% $H_2SO_4$. The solubility of large fullerenes is higher than 10,000 ppm or 1 wt % in 96% $H_2SO_4$. Large fullerenes are not functionalized in these concentrated sulfuric acids; therefore, the dispersion mechanism is dissolution. The average size of LFs solubilized in sulfuric acid increases with the strength of the acid. This work opens the way to further understanding the mechanism of large fullerene stabilization in acid dispersions, which has application for the extraction, isolation and purification of large fullerenes.

Figure 5:
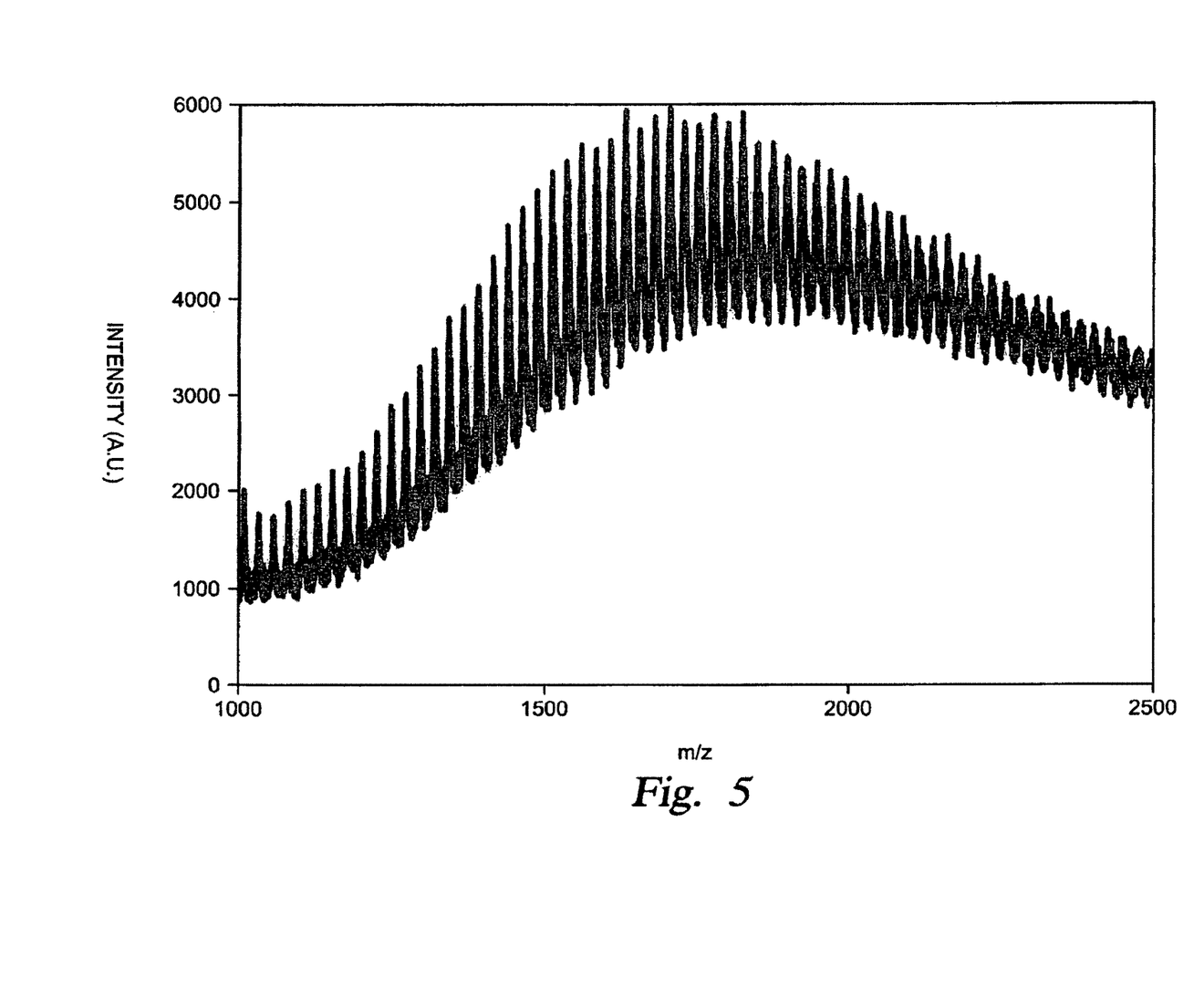
FIG. 5 depicts MALDI spectra of large fullerenes in the starting sample showing evenly separated masses at a spacing of 24 amu arising from the spacing of $C_2$ species.

FIG. 5 shows MALDI spectra of large fullerenes in the starting material.

Figure 6:
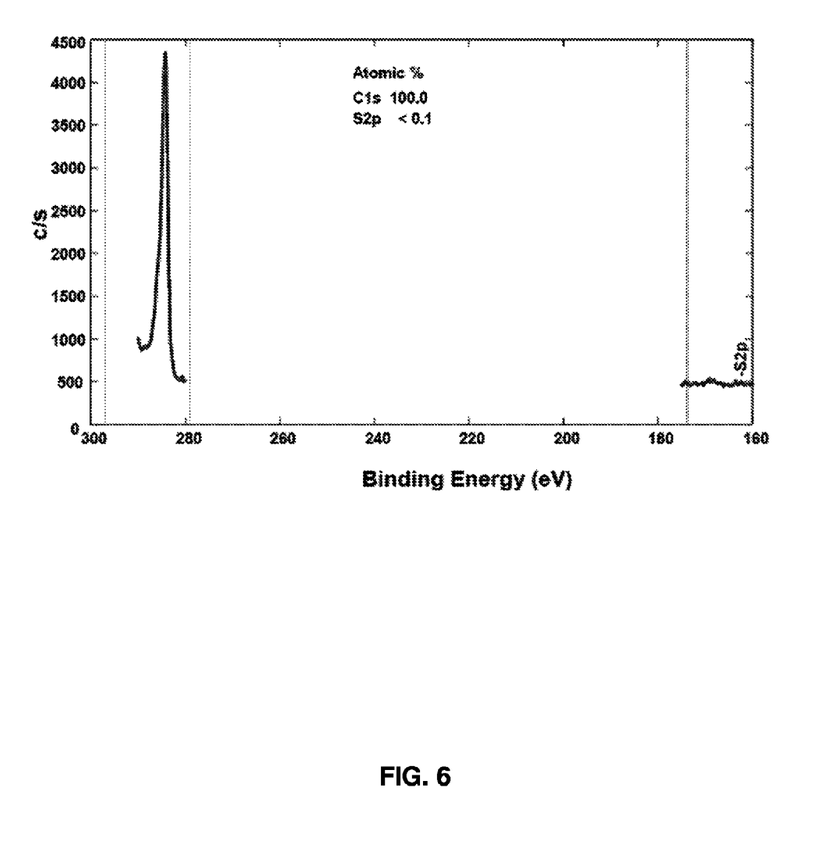
FIG. 6 depicts XPS spectra of large fullerenes dissolved in 96% sulfuric acid for two weeks and then quenched in ether and washed with methanol showing presence of only carbon atoms.

FIG. 6 shows XPS spectra of large fullerenes dissolve in 96% sulfuric acid for two weeks and then quenched in ether and washed with methanol.

Although the invention has been described with reference to specific embodiments, these descriptions are not meant to be construed in a limiting sense. Various modifications of the disclosed embodiments, as well as alternative embodiments of the invention will become apparent to persons skilled in the art upon reference to the description of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore, contemplated that the claims will cover any such modifications or embodiments that fall within the true scope of the invention.

What is claimed is:

1. A method for processing a fullerene starting material comprising large fullerenes, said method comprising:
   (a) mixing the fullerene starting material with a first concentrated sulfuric acid solution to obtain a first dispersion comprising a first portion of the large fullerenes solubilized in the first concentrated sulfuric acid solution, wherein the large fullerenes have a size of at least that of $C_{100}$.

2. The method according to claim 1, wherein the first concentrated sulfuric acid solution has a concentration greater than 85% $H_2SO_4$.

3. The method according to claim 2, wherein the first concentrated sulfuric acid solution has a concentration of at least 88% $H_2SO_4$.

4. The method according to claim 3, wherein the first concentrated sulfuric acid solution has a concentration of at least 90% $H_2SO_4$.

5. The method according to claim 4, wherein the first concentrated sulfuric acid solution has a concentration of at least 96% $H_2SO_4$.

6. The method according to claim 1, wherein the first portion of the large fullerenes is 100% of the large fullerenes in the fullerene starting material.

7. The method according to claim 1, wherein the first portion of the large fullerenes is less than 100% of the large fullerenes in the fullerene starting material.

8. The method according to claim 1, further comprising:
   (b) collecting a remainder of the fullerene starting material, wherein the remainder of the fullerene starting material is not present in the first dispersion; and
   (c) mixing the remainder of the fullerene starting material with a second concentrated sulfuric acid solution to obtain a second dispersion comprising a second portion of the large fullerenes solubilized in the second concentrated sulfuric acid solution.

9. The method according to claim 1, wherein the first portion of the large fullerenes has a first average fullerene size dependent on a concentration of the first concentrated sulfuric acid solution.

10. The method according to claim 8, further comprising:
    (d) selecting a concentration of the first concentrated sulfuric acid solution to select a first size measure comprising an average fullerene size of the first portion, a maximum fullerene size of the first portion, a distribution of fullerene sizes of the first portion, or combinations thereof.

11. The method according to claim 10, further comprising:
    (e) selecting a concentration of the second concentrated sulfuric acid solution to select a second size measure comprising an average fullerene size of the second portion, a maximum fullerene size of the second portion, a distribution of fullerene sizes of the second portion, or combinations thereof.

12. The method according to claim 9, wherein the first average fullerene size is determined in units of mass.

13. The method according to claim 11, wherein the first size measure and the second size measure differ.

14. The method according to claim 1, further comprising:
    (b) removing small fullerenes from the fullerene starting material before (a) occurs, wherein the small fullerenes have a size less than that of $C_{100}$.

* * * * *

UNITED STATES PATENT AND TRADEMARK OFFICE
CERTIFICATE OF CORRECTION

PATENT NO. : 8,591,854 B2  
APPLICATION NO. : 12/672605  
DATED : November 26, 2013  
INVENTOR(S) : Rai et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 787 days.

Signed and Sealed this
Twenty-second Day of September, 2015

Michelle K. Lee
*Director of the United States Patent and Trademark Office*